US006821146B2

(12) United States Patent
Tolmie

(10) Patent No.: US 6,821,146 B2
(45) Date of Patent: Nov. 23, 2004

(54) HYBRID CONNECTOR SYSTEM AND METHOD

(76) Inventor: Bernard R. Tolmie, 204 Brand Farm Rd., S. Burlington, VT (US) 05403

( * ) Notice: Subject to any disclaimer, the term of this patent is extended or adjusted under 35 U.S.C. 154(b) by 50 days.

(21) Appl. No.: 10/321,744

(22) Filed: Dec. 17, 2002

(65) Prior Publication Data
US 2003/0129872 A1 Jul. 10, 2003

Related U.S. Application Data

(63) Continuation-in-part of application No. 10/040,657, filed on Jan. 7, 2002, now Pat. No. 6,612,857.

(51) Int. Cl.[7] .......................................... H01R 33/945
(52) U.S. Cl. ...................................... 439/577; 439/608
(58) Field of Search ............................ 439/577; 385/75

(56) References Cited

U.S. PATENT DOCUMENTS

| | | | | |
|---|---|---|---|---|
| 3,790,654 A | * | 2/1974 | Bagley .................. 264/177.11 |
| 4,779,948 A | * | 10/1988 | Wais et al. .................... 385/88 |
| 4,846,727 A | | 7/1989 | Glover ....................... 439/608 |
| 4,985,000 A | | 1/1991 | Tengler ...................... 439/497 |
| 5,104,243 A | | 4/1992 | Harding ....................... 385/84 |
| 5,109,452 A | * | 4/1992 | Selvin et al. ................. 385/69 |
| 5,162,001 A | * | 11/1992 | Harwath et al. ............. 439/608 |
| 5,175,928 A | * | 1/1993 | Grabbe ........................ 29/884 |
| 5,176,538 A | | 1/1993 | Hansell ....................... 439/607 |
| 5,342,211 A | | 8/1994 | Broeksteeg ................. 439/108 |
| 5,345,527 A | | 9/1994 | Lebby ......................... 385/114 |
| 5,346,412 A | | 9/1994 | Fedder ....................... 439/681 |
| 5,367,593 A | | 11/1994 | Lebby .......................... 385/53 |
| 5,460,533 A | | 10/1995 | Broeksteeg ................. 439/101 |
| 5,518,422 A | | 5/1996 | Zell ........................... 439/608 |
| 5,625,734 A | | 4/1997 | Thomas ....................... 385/88 |
| 5,632,635 A | | 5/1997 | Vanbesien ................... 439/108 |
| 5,664,968 A | | 9/1997 | Mickievicz ................. 439/608 |
| 5,718,592 A | * | 2/1998 | Hosler et al. ................. 439/63 |
| 5,741,144 A | | 4/1998 | Elco ........................... 439/101 |
| 5,745,622 A | * | 4/1998 | Birnbaum et al. ............ 385/75 |
| 5,768,456 A | | 6/1998 | Knapp ......................... 385/49 |
| 5,924,899 A | * | 7/1999 | Paagman ..................... 439/701 |
| 6,083,047 A | | 7/2000 | Paagman ..................... 439/608 |
| 6,132,255 A | | 10/2000 | Verhoeven ................... 439/608 |
| 6,179,663 B1 | | 1/2001 | Bradley ...................... 439/608 |
| 6,217,372 B1 | | 4/2001 | Reed .......................... 439/497 |
| 6,243,508 B1 | | 6/2001 | Jewell ......................... 385/14 |
| 6,283,792 B1 | | 9/2001 | Tolmie ....................... 439/608 |
| 6,478,625 B2 | | 11/2002 | Tolmie ....................... 439/577 |
| 6,554,486 B1 | * | 4/2003 | Takamatsu et al. ........... 385/75 |

OTHER PUBLICATIONS

Us Patent Publication 20010026388, Zemten et al 359/163.

* cited by examiner

*Primary Examiner*—Hae Moon Hyeon

(57) ABSTRACT

A hybrid connector for transmitting different types of electrical signals, or both electrical and optical signals, is disclosed. The hybrid connector includes a metallic extruded housing having a plurality of connector channels formed therein during extrusion. The connector also includes an intermediate printed circuit board (IPCB) having contact members fixed to the IPCB and that reside within respective connector channels. The contact members include contact pins for transmitting electrical signals and optical fibers for transmitting optical signals.

16 Claims, 17 Drawing Sheets

HYBRID CONNECTOR SYSTEM AND METHOD

CROSS-REFERENCE TO RELATED PATENTS AND PATENT APPLICATIONS

This application is a continuation-in-part of U.S. patent Ser. No. 10/040,657, filed Jan. 7, 2002, now U.S. Pat. No. 6,612,857 entitled "Electrical connector system and method," which patent application is incorporated by reference herein, and which patent application has a common inventor. This patent application is also related to U.S. Pat. No. 6,478,625 issued on Nov. 12, 2002, and entitled, "Electrical-optical hybrid connector," which patent is incorporated by reference herein, and which patent has a common inventor. The present application is also related to U.S. Pat. No. 6,283,792 B1, issued on Sep. 9, 2001, and entitled "Extruded metallic electrical connector assembly and method of producing same," which patent has a common inventor and is commonly assigned with the present patent application, and which patent is incorporated by reference herein.

FIELD OF THE INVENTION

The present invention pertains to connectors, and in particular, to an extruded metallic connector assembly that allows for the connection of optical fibers and/or electrical wires.

BACKGROUND OF THE INVENTION

Electrical connectors are used in many different types of electrical and electronic systems. They come in various sizes depending on the physical and electrical parameter of the installation. Some high-speed digital signal applications require multiple contact connectors in a single rectangular module that are held together and are stackable without distorting or adversely modifying the signal intelligence. Digital signals must have a high degree of signal integrity on entering and exiting an electrical connector system. Requirements for connector types, in increasingly high-speed applications include a high degree of shielding, preventing signal distortion from outside Electromagnetic Interference (EMI) and low inductance and resistance for signal and return signal paths.

Rectangular connectors with multiple contacts that are two millimeter (2 mm) or less in center spacing have limits in contact density and signal shielding by currently employed manufacturing processes. However, electronic systems that use high-speed connectors continue to shrink in physical size and require increasing signal density, which requires reducing the physical size requirements for connectors. Present rectangular connectors having a plurality of contacts have limits in providing dense signal packaging and shielding of each individual contact within the connector-housing module. However, the contact is not shielded along the contact length as in classical coaxial connectors.

Although classical round coaxial connectors have contiguous shielding along their contact length and provide low inductance and good signal integrity, they do not offer a large number of contacts, particularly for densities of 2 mm on-center or less, in a rectangular configuration. In round coaxial connections, multiple contiguous contacts cannot be densely packed or stacked in a module form to densities attainable in a rectangular configuration and still have each signal contact surrounded within a metal enclosure along the length of the contact. Rectangular connectors for high-speed signal applications that employ a plurality contacts with 2 mm on-center or less spacing use a combination of injection molded plastics and metal. In particular, the plastic parts are either riveted or press fitted to metal plates to simulate shielding, form signal impedance matching, and to reduce inductance and resistance to improve signal integrity. However, these connector systems, while providing greater contact densities than round coaxial connectors, do not provide a contiguous metal cavity along the length of each individual contact. Instead only one or two sides of each individual contact has a shield.

Presently, most high-density connectors are either electrical or optical. Some fiber optic interfaces occur at the printed circuit board level and convert the electrical signal to light (optical) signals through devices such as a vertical cavity surface emitting lasers (VCSELs), whereby the electrical high speed signal is converted into high-speed modulated light signal. However, there are signal density issues with the present state-of-the-art connectors. Accordingly, there is a need for a truly cost-effective, high-density and easy to manufacture hybrid connector, i.e., a connector that can provide connectivity for a variety of different types of electrical signals, or electrical and optical signals.

SUMMARY OF THE INVENTION

The present invention pertains to electrical connectors, and in particular, to an extruded metallic electrical connector assembly that allows for the connection of optical fibers and/or electrical wires.

An example embodiment of the invention is a rectangular connector having a plurality of contacts, with each contact being enclosed in a metal shield along the contact length. The assembly has a rectangular metallic housing that contains a plurality of contact channels through which the contacts are inserted. The contacts are insulated from the surrounding housing by a coating on the inside of the housing. The contacts are connected at one end of the housing to an intermediate printed circuit board (IPCB). The other end of the housing forms the mate to a receptacle mounted on the motherboard of an electronic system. The housing assemblies are stackable because of their shape. The invention also includes a hybrid electrical-optical connector that employs VCSEL technology, so that both electrical and optical connections can be accommodated in the same connector. Further, the connector can include a connector cooling system to cool the connector.

Another example embodiment of the invention is a hybrid connector for transmitting different types of electrical signals, or electrical and optical signals. The different types of electrical signals include RF signals, analog signals and high-speed digital signals. The hybrid connector includes a metallic extruded housing having a plurality of connector channels formed therein during extrusion. The connector also includes an IPCB attached to the extruded housing. Contact members are fixed to the IPCB and reside within respective connector channels. The contact members include contact pins, each adapted to transmit a particular electrical signal type, as well as optical fibers for transmitting optical signals. The contact members used in the connector may include contact pins or a combination of contact pins and one or more optical fibers. In an example embodiment, select contact pins are terminated at a device, such as a VCSEL or wireless RF transmitter, residing on the IPCB. Such devices allow for communication with external devices (i.e., devices remote from the connector assembly) with a form of signal that is different from the form of the signal entering the connector.

DETAILED DESCRIPTION OF THE INVENTION

The present invention pertains to electrical connectors, and in particular, to an extruded metallic electrical connector assembly that allows for the connection of optical fibers and/or electrical wires.

Figure 1:
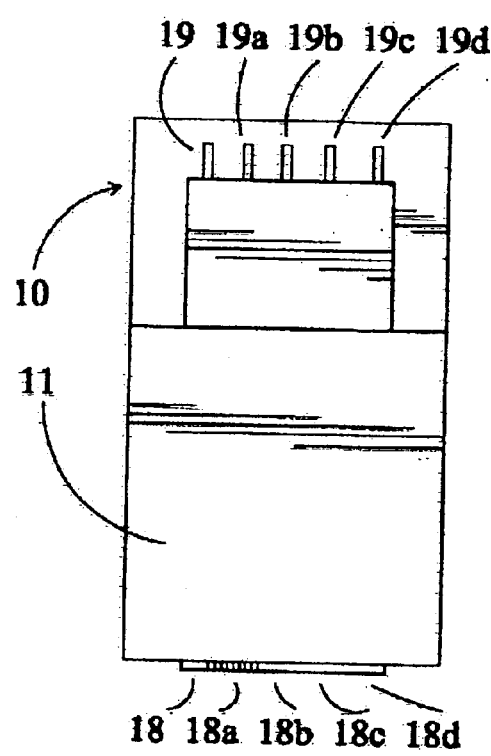
FIG. 1 is a top plan view of the novel extruded metallic connector assembly of the type that can be connected to an electrical cable.
Figure 2:
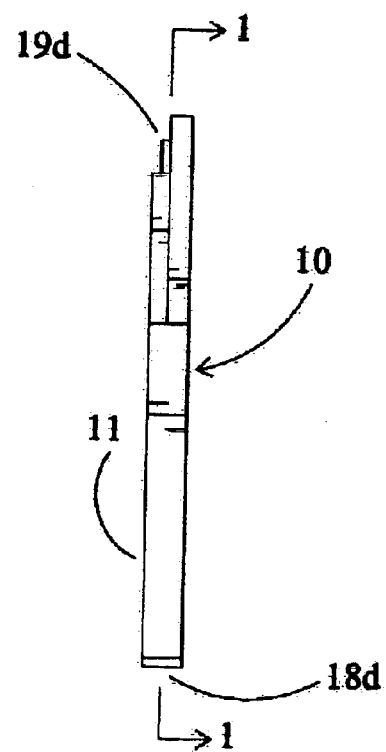
FIG. 2 is a side elevational view thereof.
Figure 3:
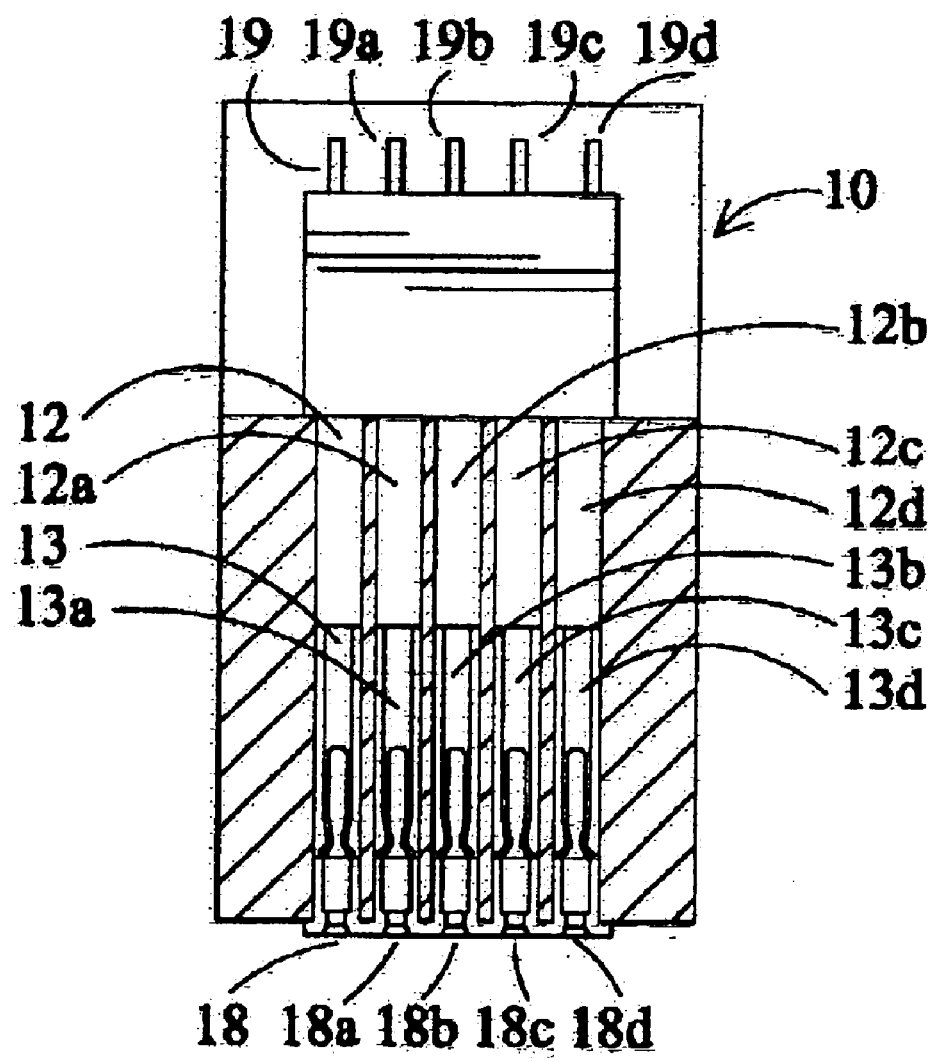
FIG. 3 is a cross sectional view taken along line 1—1 of FIG. 2.
Figure 4:
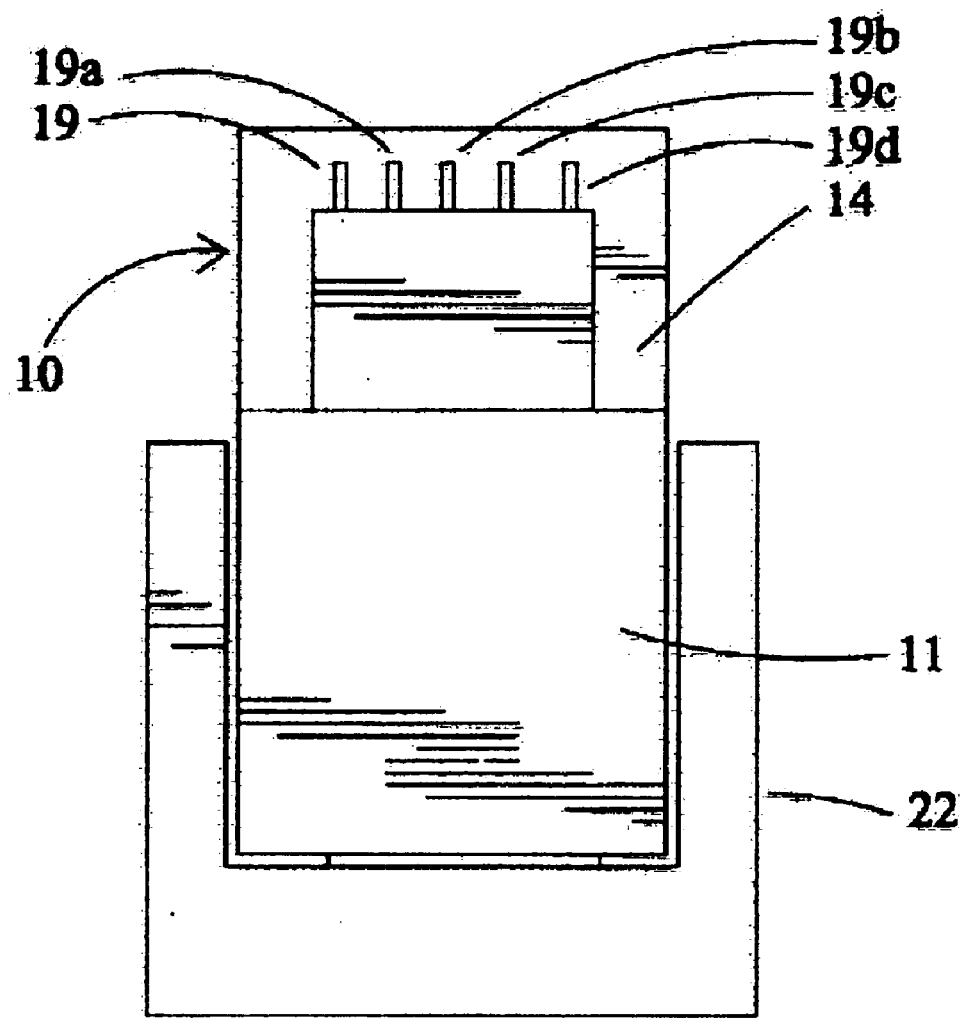
FIG. 4 is a frontal elevational view of connector assembly for mounting a mating receptacle.

As shown in the Figures, the extruded metallic electrical connector assembly 10 (FIG. 1) provides a four-sided metal enclosure along the contact's length of individual contacts for high-density low inductance, resistance and good signal integrity. This means and method of shielding each individual contact along the contacts length by the connector housing 11 (FIG. 4) contiguously extruded from metal to form individual channels 12, 12a, 12b, 12c and 12d (FIG. 3) to house each contact providing multiple cavities. In an example embodiment, the contacts are on centers of 2 mm or less. In an example embodiment, the interior of the channels are insulated from an inserted electrical contact by coating the interior of each channel wall with an insulation material having good dielectric properties for the signal transmission and contact insulation.

Figure 6:
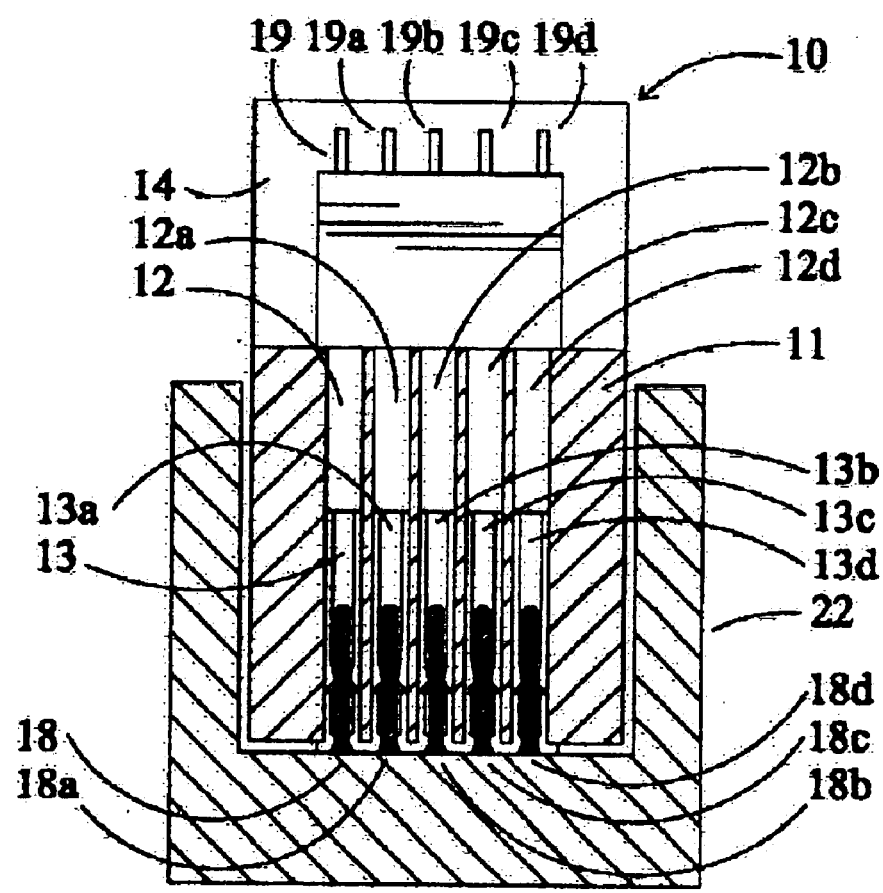
FIG. 6 is a cross-sectional view taken along line 6—6 of FIG. 5 showing the underside mounted to a mating connector receptacle.
Figure 7:
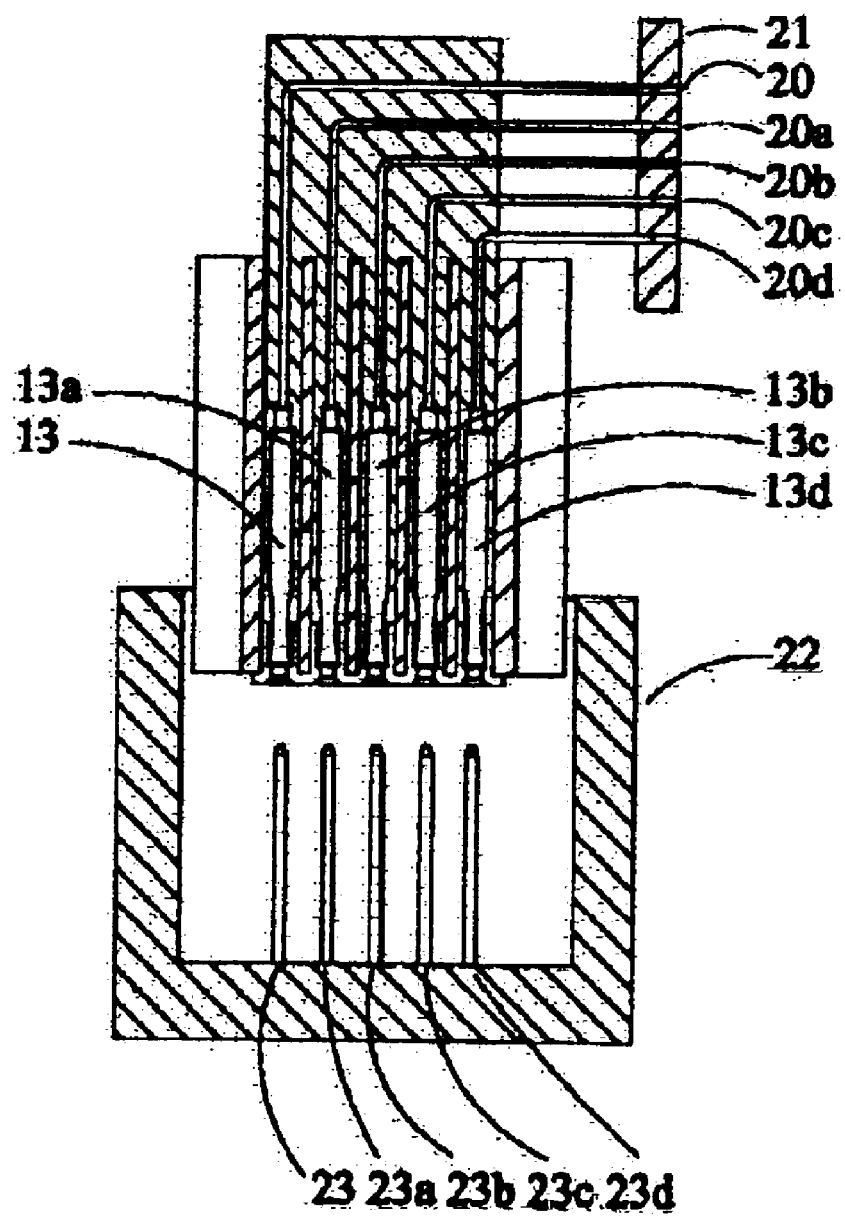
FIG. 7 is a cross sectional view showing the connector assembly mounted to a motherboard above the receptacle.
Figure 11:
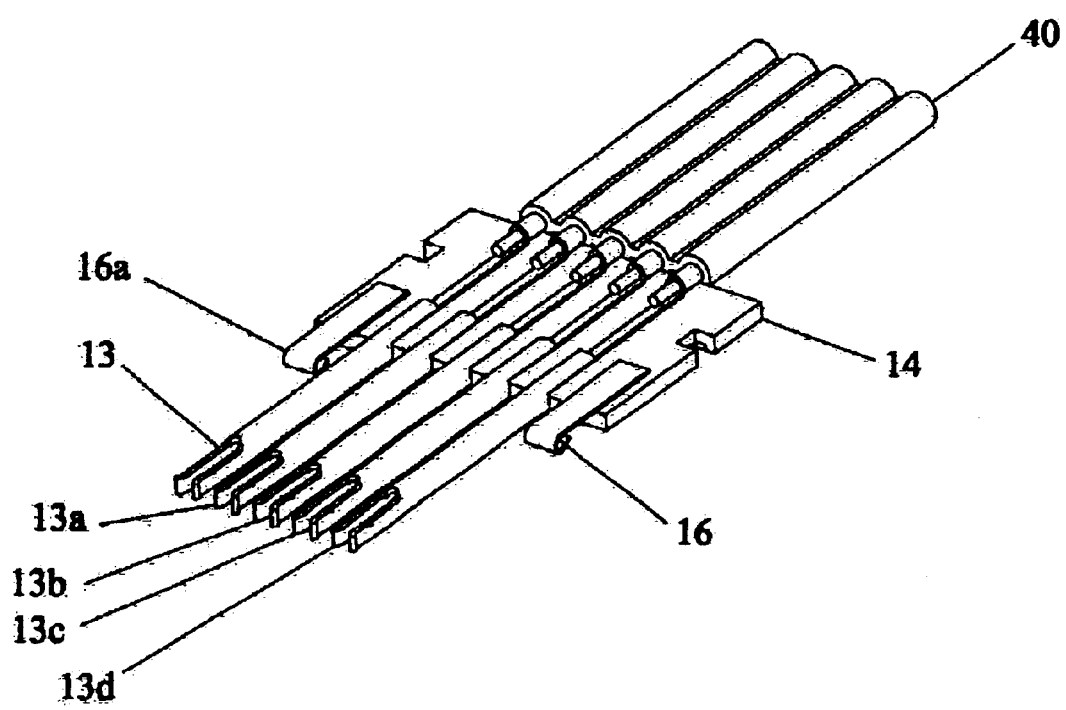
FIG. 11 is a perspective view showing the intermediate printed circuit board and contact point assembly terminated to an electrical cable.

Contact pins 13–13d are inserted into channels 12–12d (also referred to herein as "cavities"), guided by mating guides 18–18d. The latter are positioned at the mating end of housing 11 opposite the end where a intermediate printed circuit board (IPCB) 14 is connected. The mating guides are inserted into the housing by a press-fit, by a weld, or an adhesive (see FIGS. 1, 3 and 11). IPCB 14 (FIG. 6) includes solder tails 19, 19a, 19b, 19c and 19d or a board press-fit 20a, 20b, 20c and 20d that allow a cable or another printed circuit board to be attached to IPCB 14 (FIG. 7). Contact pins 13–13d are directly mounted to IPCB 14 making up part of the connector assembly 10 for termination to an electrical cable assembly. Alternatively, IPCB 14 can be terminated to a printed circuit board (motherboard) 21 for the connector assembly to mate to a printed circuit board connector (receptacle) 22 (FIG. 7). The IPCB 14 can have circuit board traces that route signals through solder tails 19, 19a, 19b, 19c and 19d to the connector contacts in the housing module.

Figure 5:
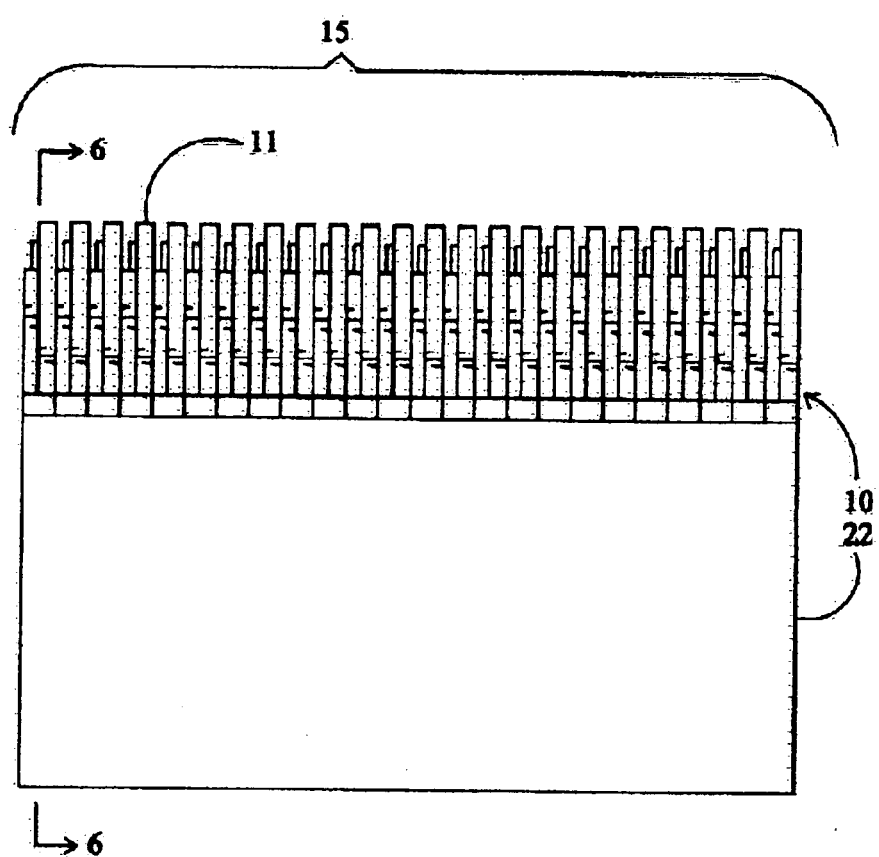
FIG. 5 is a side elevational view of the stacked individual connector assemblies and mated view of connector assemblies for mounting to an electrical cable.

The other mating half (i.e., the receptacle) 22 of the connector accepts the extruded housing 11 in a single or stackable modular configuration 15 having the same center spacing (FIG. 5). In an example embodiment, the center spacing is two mm on-center or less. Each half of mating connector 22 has a contact pin 23 through 23d. The contact pins of each half make contact in a tuning-fork fashion (displacing each pin 13–13d along its length thus making electrical contact). The contact of the mating connector pins is made inside the extruded connector-housing module 11. Thus, the enclosed mating contact pins reside inside the connector-housing cavity providing a four-sided metal enclosure along the length of the mating pins. Traditionally, connector housings are often injection molded from plastics and fit with a metal shield or metal stiffeners in an attempt to achieve a partially shielded enclosure.

The extruded housing 11, however, provides a four-sided metal enclosure for each contact along the length of the contact. Housing 11 (also referred to herein as "contiguous metal shield") is grounded through the intermediate printed circuit board 14 using contact tension points 16 and 16a. In this manner, shielded contact density is higher in the extruded module for each individual contacts then the previous patents.

For example, in prior art rectangular housing modules, the signal density is limited by the spacing between adjacent contacts, which are surrounded by an injection-molded material in the multiple connector modules. The prior art makes some adjustment for the shield limitation by optionally grounding adjacent pins (e.g., this would be accomplished in the present invention by alternately grounding pins 13 through 13d) between the signal pins. In this manner, each signal pin may have an adjacent ground pin. In addition, certain prior art has one outside face on two sides of each module shielded by attaching a metal plate, versus the four sides of the present invention. The insulation between contacts in the prior art is typically injection-molded material. Thus, the signal or ground pins do not have a contiguous metal enclosure on all four sides.

In the prior art the shielded signal density tends to be limited by the need for adjacent ground pins or the mechanical construction of each connector module. This is also true when the mating halves of the connectors are joined. Thus, the signal density (i.e., the number of signal pins divided by the total number of signal and ground pins) in a five-row connector with the extreme outside pins and middle pin forming a ground shield for the signal contacts, there are only two signal remaining signal contact pins. Furthermore, there is limited contact shielding in the connector module. In the prior art, each individual contact does not have a rectangular metal enclosure. Rather, the entire connector module contains a plurality of contacts and metal plates covering three sides of the outside housing. The extruded connector housing module 11 provides channels 12 through 12d that enclose each of the example of individual metal contacts 13 through 13d in a contiguous metal shield 11 along the length of each contact.

Figure 10:
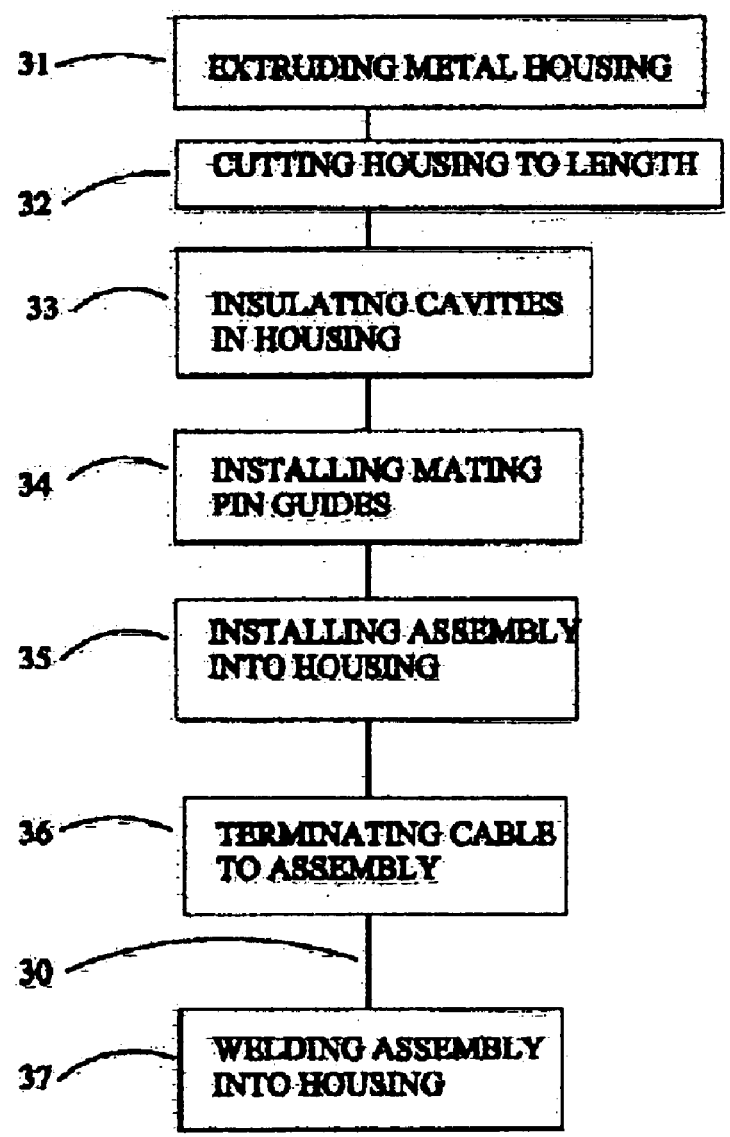
FIG. 10 is a block diagram of the novel method of producing an extruded metallic electrical connector assembly.

The method 30 of producing an extruded metallic electrical connector assembly (steps 31–37 of FIG. 10) according to the present invention comprises the steps of extruding a continuous metal housing having a plurality of channels 12 positioned therein (step 31); cutting the housing to the desired length (step 32); coating the inside of the channels of the metal housing with an insulation material (step 33); installing the mating guides (step 34); installing the printed circuit board into said housing (step 35); terminating electrical cable to the IPCB assembly used in cable assembly operation or IPCB fitted with wire mounting for motherboard installation (step 36); and electrically connecting (e.g., by welding) the assembly to the housing (step 37) to form a cable assembly thereby forming a cable assembly or wire mounting to motherboard 21.

Electrical-Optical Hybrid Connector

The present invention also includes a novel hybrid concept of using the extruded metal housing and connecting same to an IPCB to facilitate both optical and electrical signal transmission. This is accomplished by making the connector have a hybrid configuration that permits the output of the connector at the intermediate printed circuit board to be a mix of optical and electrical transmission.

Figure 12:
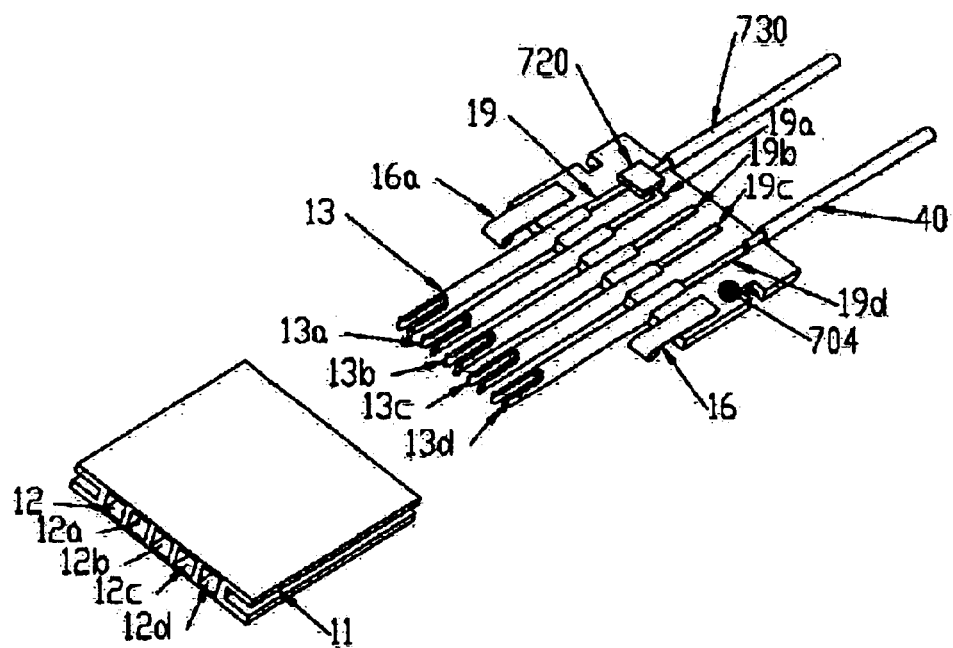
FIG. 12 is a perspective exploded view of the hybrid electrical-optical connector of the present invention similar to FIG. 11, but further including optical fibers and VCSELs attached to the intermediate printed circuit board.

Accordingly, with reference now to FIG. 12, there is shown an exploded view of the hybrid connector assembly 700 of the present invention. Hybrid connector 700 includes extruded metal connector housing 11, with channels 12–12d formed therein during extrusion, as described above. Connector 700 also includes IPCB 14 with a planar surface 704, which includes electrical contact pins 13–13d, and connector tension points 16 and 16a coupled to one end of the IPCB, also as described above. IPCB 14 also includes solder tails 19 (e.g., printed circuit board LAN), also described above, that connect contact pins 13–13d to one of either electrical cable (wire) 40 or one or more vertical cavity surface emitting lasers (VCSELs) 720 arranged on planar surface 704.

As is known in the art, a VCSEL is a device that takes a modulated electrical signal and converts it to a correspondingly modulated optical (laser) signal, or vice versa. Suitable VCSELs for the present invention are available, for example as part numbers ic-jwb 2.7 and ic-wk (laser-diode drivers) from IC Haus Corp., Sanford, Mich. (info@glaserdriver.com), or from the Optical Interconnect Development Association, Washington, D.C., (Rockwell Science Center) model rsc110 (laser driver 2.5–10 Gbps), or from W. L. Gore, Wilmington, Del. (VCSEL laser driver). Information about VCSELs can be found in a paper entitled "design of 2.5 Gbit/s GaAs laser driver with integrated APC for optical fiber communications," by Guillaume Fortin and Bozena Kaminska.

With continuing reference to FIG. 12, each VCSEL 720 receives a positive voltage and ground provided through dedicated contact pins (e.g. one of contact pins 13–13d and one of connection tension points 16) through conductive housing 11. One or more optical fibers (e.g., fiber cables) 730 are connected to IPCB 14 so as to be optically coupled to corresponding VCSELs 720, analogous to electrical wires 40 being electrically coupled to corresponding solder tails 19–19d. Optical fibers 730 may be single mode or multiple-mode, depending on the application.

In one mode of operation, an electrical signal enters assembly 700 through, say, pin 13a as shown. The electrical signal then travels through the associated solder tail 19a and into the corresponding VCSEL 720. The VCSEL converts the electrical signal into a corresponding optical signal, which is then passed to optical fiber 730. Assembly 700 can be used to go from optical to electrical signals (i.e., from driver to receiver) by reversing the VCSEL to operate as a laser receiver. Thus, hybrid connector assembly 700 allows for connection of both electrical and optical high-speed digital signals in a parallel configuration.

Figure 13:
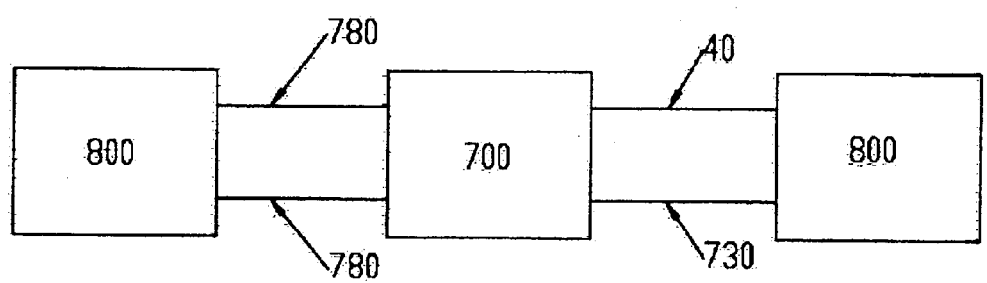
FIG. 13 is a schematic diagram of the hybrid connector of the present invention as shown in FIG. 12 as used to connect two remote circuits.

With reference to FIG. 13, an advantage of assembly 700 is connecting to different remote circuits 800 (e.g., back planes, mother boards, distribution panels, etc.) through assembly 700 with both optical fibers 730 and electrical wires 40 to one remote circuit, while electrically connecting to another remote circuit via one of a number of electrical connections 780 (e.g., vias on printed circuit boards, wires, etc.).

In a preferred embodiment of the present invention as illustrated in FIG. 13, the longer interconnections to remote circuit 780 can be accommodated by optical fiber (thereby ensuring signal integrity), while the shorter interconnections can be accommodated by more cost-effective electrical cable through electrical interconnects while still ensuring signal integrity. Thus, both electrical and optical high-speed connections can be provided in the single connector of the present invention.

Electrical Impedance-Matched Connector

With reference again to FIG. 12, channels 12, 12a, 12b, etc. of housing 11 can be sized (i.e., cross-sectional area) to achieve a desired impedance when mated with a contact (e.g., contacts 13, 13a, 13b, etc.) of a particular size. In an example embodiment of the present invention, contacts 13, 13a, 13b, etc. are capable of carrying an electrical signal having a discrete signal format, while in another embodiment the contacts can carry an electrical signal having a differential format used for logic in high-speed signal transmission. Further, the cross-sectional area of the contacts can be sized relative to the channel to achieve a desired connector impedance. This is because the connector impedance is determined by the relative cross-sectional area of the outer conductor (i.e., channel 12) to the cross-sectional area of the contact (e.g., 13), and the spacing between the conductive surfaces. For example, as discussed above, IEC specifications call for a two-millimeter (2 mm) on-center channels 12–12d.

In an example embodiment of the invention, the contact has a cross-sectional area such that it yields an impedance value of between about 45 and 60 ohms. However, the present invention is not limited by the IEC specifications.

Accordingly, the connector impedance for a variety of different sized connectors can be matched set by selecting the ratio of the cross-sectional area of the channels to that of the contacts. This allows connector assembly 10 to provide the highest level of signal integrity by matching the impedance of the signal passing from pins 23, 23a, 23b, etc. to contacts 13, 13a, 13b, etc. (FIG. 7).

Further, the connector of the present invention is capable of passing a very high digital signal speed. The speed of a connector can be measured in gigabits per second, which is the frequency bandpass of a connector (measured in GHz) times 2. A typical high-speed electrical connector has a limited signal speed due to electrical and mechanical properties to approach and surpass 1 gigabit/second. The connector of the present invention is capable of passing signals at much higher speeds approaching 10 gigabits/second, a ten-fold increase over typical connectors.

The connector of the present invention should find utility over a wide range of high-speed communication applications. For example, the IEEE standard for the 1 gigabit/second Ethernet interconnect can be accomplished using either copper wires or optical fibers. However, the new IEEE 10 gigabit/second Ethernet standard is considering more costly optical fibers only, recognizing the perceived limitation of copper wires. Thus the embodiment provides a choice between interconnects having more cost-effective copper versus fiber in a hybrid configuration.

Connector Cooling Channel and System

In electrical-optical (hybrid) assembly 700, electrical power may be dissipated by Joule heating caused by VSCEL 720 or by the power supply and connections (e.g., resistive heating of the connecting wires). Further, in both electrical connector assembly and hybrid assembly 700, Joule heating of the assembly may arise where one or more contacts 13, 13a, 13b, etc. are dedicated to carrying electrical power. Thus, it may be desirable to cool the assembly to reduce the risk of overheating elements of the assemblies, e.g., VCSEL 720, IPCB 14, or cable assembly 40.

Figure 14:
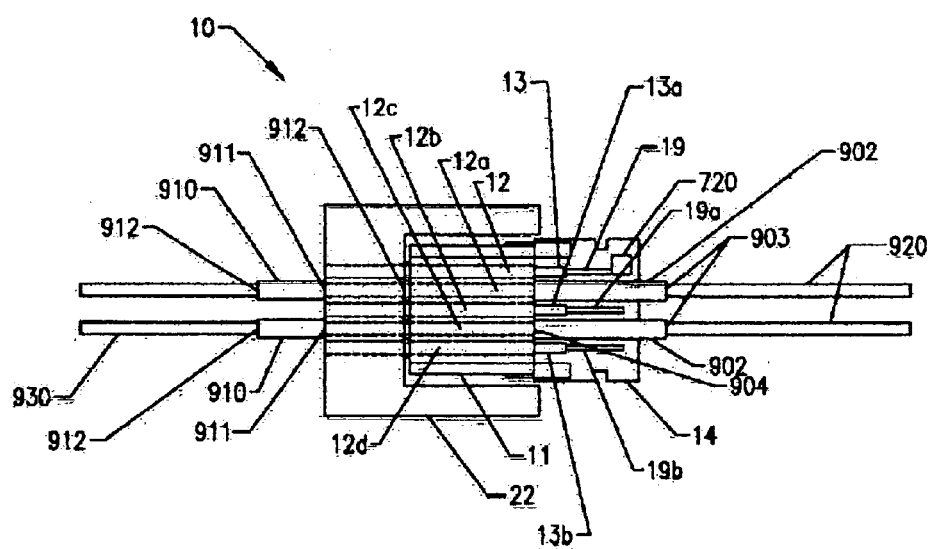
FIG. 14 is a plan view of the connector cooling system of the present invention.

With reference to FIG. 14, in the present invention, extruded housing 11 has contiguous metal channels 12 formed by extrusion. As such, channels 12 are sealable with respect to fluid (e.g., gas or liquid). Thus, one or more of the connector channels 12, 12a, 12b, etc. can serve as cooling channels is they are kept open (i.e., free from one or more of electrical contact pins 13, 13a, 13b, etc.). In previous art, the mechanical constraints do permit sealing. Accordingly, in place of one or more of solder tails 19, 19a, 19b, etc. and the corresponding one or more of contacts 13, 13a, 13b, etc., one or more fluid channels 902 for carrying a fluid and is provided, as shown FIG. 14. Each fluid channel 902 has a first end 903 and a second end 904, wherein end 904 is sized to mate or otherwise connect with the corresponding one or more of channels 12, 12a, 12b, etc. An example material for fluid channel 902 is a plastic or polymer. Example fluids are inert gas, air, glycol, glycerin and water. The cooling fluid makes contact with housing 11 and removes the heat from the housing via heat conduction.

Also included is one or more fluid channels 910 that replace one or more mating contact pins 23, 23a, 23b, etc. (see FIG. 7) that reside upon the other half (i.e., plug-half) 22 of the connector receptacle. Each fluid channel 910 has a first end 911 and a second end 912. End 912 is sized to mate or otherwise connect with the corresponding one or more of channels 12, 12a, 12b, etc.(e.g., channels 12a and 12c as shown in FIG. 14 at end 904) designated as cooling channels, at the end where mating contact pins are normally inserted. In an example embodiment, fluid channels 910 are the same as fluid channels 902.

Figure 15:
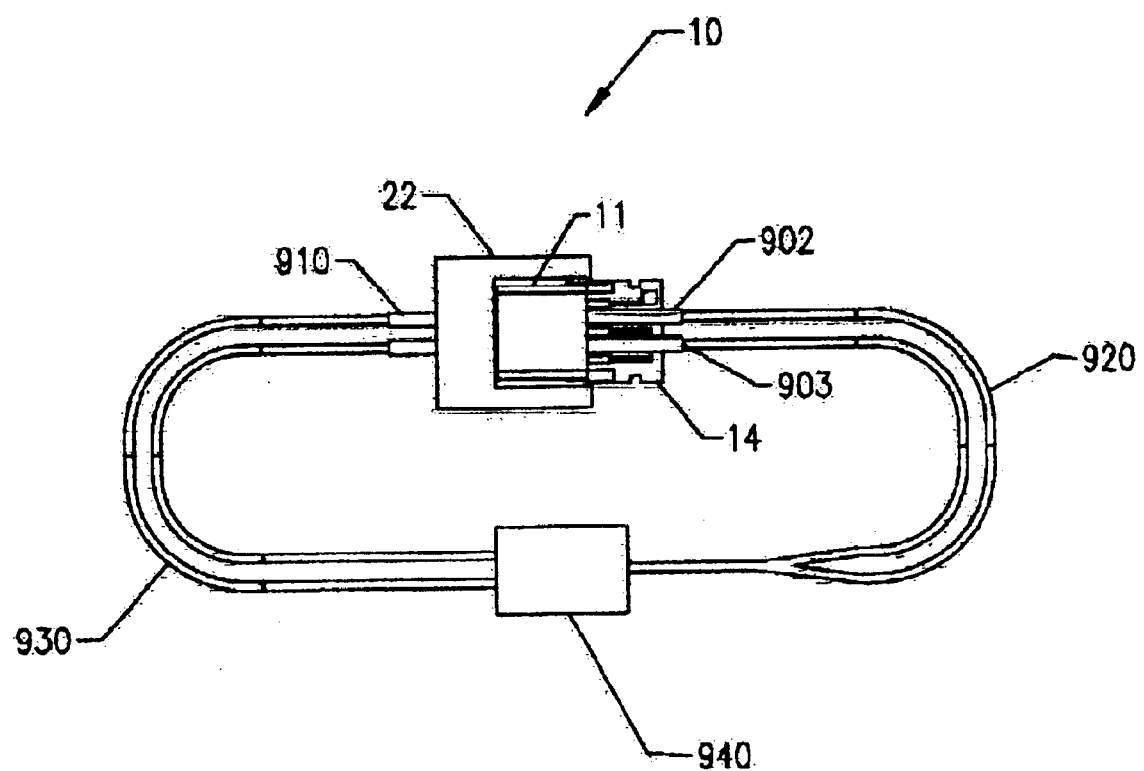
FIG. 15 is a plan view of the connector cooling system of the present invention shown connected to a fluid source via cooling lines.

Connected to each of the one or more fluid channels 902 at ends 903 is a fluid line 920, and connected to each of the one or more fluid channels 910 at end 912 is a fluid line 930 connected through end 904. Each of fluid lines 920 and 930 are connected to a fluid source 940 (FIG. 15) that flows the fluid through the fluid lines 920 and 930, fluid channels 902 and 910 and one or more of channels 12, 12a, 12b, etc., that are designated as cooling channels (FIG. 15). In FIGS. 14 and 15, channels 12a and 12c are designated as cooling channels to illustrate an example embodiment.

In an example embodiment, fluid lines 920 and/or 930 are single fluid lines that have branches connecting to each of the designated fluid channels, as illustrated in FIG. 15. In another example embodiment, fluid channels 902 and/or 910 have a circular in cross-section except for the ends that mate to the rectangular connector channels. Further in an example embodiment, the channels 12, 12a, 12b, etc. dedicated to cooling need not have an insulating layer formed therein, though it may be preferable to keep the insulating layer in the channel to prevent corrosion of housing 11.

Hybrid Connector with Direct Fiber Optic Link

Figure 16:
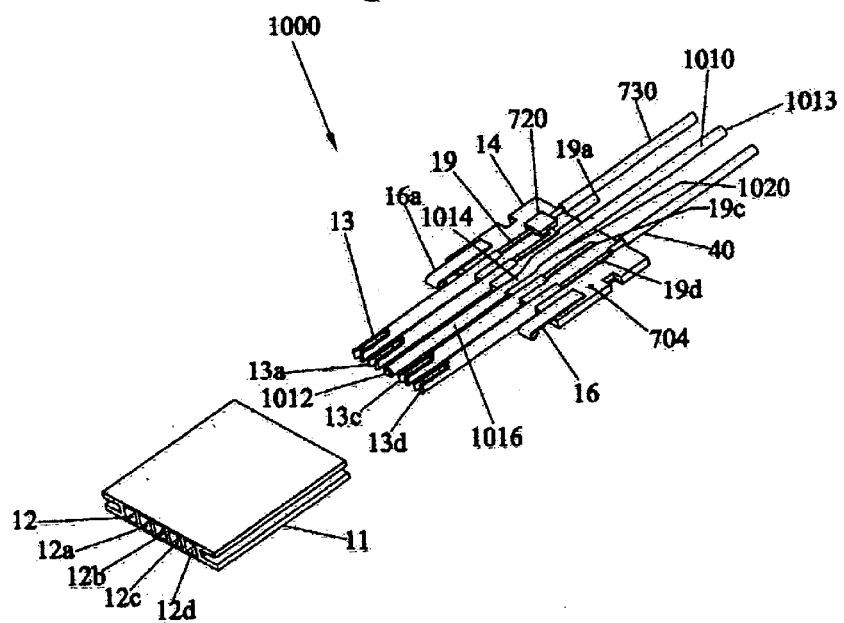
FIG. 16 is a perspective exploded view of the hybrid connector of the present invention that includes a direct optical fiber link.

With reference now to FIG. 16, there is shown an exploded perspective diagram of an example embodiment of a hybrid connector 1000. Hybrid connector 1000 is similar to connector 700 of FIG. 12, except that at least one of the contact pins (e.g., 13b) is removed and replaced with a corresponding number of optical fibers 1010 having a first end 1012 and a second end 1013.

Only one optical fiber 1010 is shown in FIG. 12 for the sake of illustration. Hereinafter, the term "contact member" is used to refer to a contact pin (e.g., pin 13a), an optical fiber such as optical fiber 1010, or any other element, including those introduced and discussed below, capable of transmitting an electrical or optical signal so as to establish an electrical or optical connection, e.g., between electrical or optical devices.

Further, the presence of VCSEL 720 and optical fiber 730 in hybrid connector 1000 is optional.

Optical fiber 1010 is attached to IPCB 14, e.g. by fitting the optical fiber into a slot 1014, or by fixing the fiber to the IPCB using an adhesive. In an example embodiment, the portion 1016 of optical fiber 1010 that extends into (i.e., mates with) housing channel 12b has a length substantially equal to pins 13a, 13c, 13d so that optical fiber first end 1012 terminates at substantially the same distance from the IPCB as the pins.

In an example embodiment, at least one of the solder tails (e.g., 19b) corresponding to a removed pin is removed as well. Optical fiber 1010 is sized to fit into the corresponding channel (e.g., channel 12b) of extruded metal housing 1. This allows the connector to provide a direct (i.e., passive) optical link to an optical device (e.g., device 1370, FIG. 19), i.e., the connector does not convert an electrical signal to an optical signal within the connector itself, or otherwise change the type of signal that enters the connector.

Hybrid connector 1000 has the advantage of providing a high degree of signal integrity. It is known in the art that for transmitting high-speed digital signals over the short haul (e.g., 10 meters or less), it is generally more cost-effective to use copper interconnects. It is also known in the art that over the long haul (e.g., over 10 meters and up to many kilometers), high-speed digital signal integrity is better maintained using direct fiber optic interfaces. However, prior art connectors do not provide both types of connections in a single connector with a high signal integrity and high signal density. On the other hand, hybrid connector 1000 provides the capability of providing both short-haul and long-haul transmission of high-speed digital signals in a signal connector. This aspect of the invention is discussed further below in connection with the system of FIG. 19.

Hybrid connector 1000 also has the advantage that it provides a higher signal density when compared to connectors that conform to the present commercial specifications, such as the IEC standard for the 2 mm on-center connector that permits both electrical and optical connections in a single connector. The hybrid connector of the present invention achieves a high signal density by using the extruded multichannel housing—and specifically, a small spacing between the channels—to define the density of the electrical and optical interconnections. Under the IEC standard, the optical interconnection is accomplished by standard fiber optic connectors, which have a large connection interface, e.g., about 5 millimeters in diameter, which is almost the width of three 2 mm on-center channels 12–12d of extruded housing 11.

By optionally including VCSEL 720 and optical fiber 730 in hybrid connector 1000, the connector has the additional capability of providing a connection via an indirect optical signal, wherein the signal starts in the connector as an electrical signal and is converted to an optical signal within the connector via VCSEL 720 on IPCB 14.

Hybrid Connector with Direct RF Link

Figure 17:
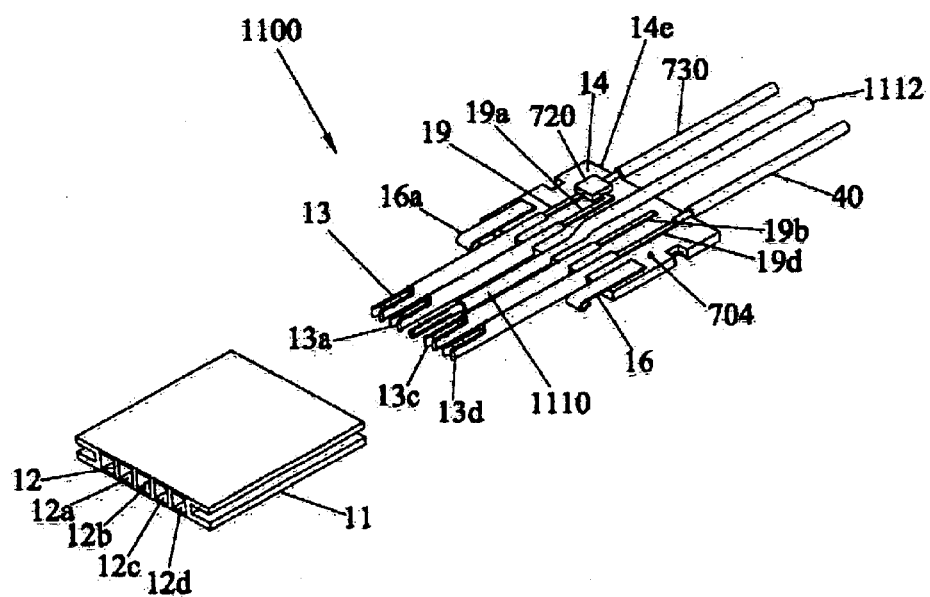
FIG. 17 is a perspective exploded view of the hybrid connector of the present invention that includes a direct RF link.

With reference now to FIG. 17, there is shown an exploded perspective diagram of an example embodiment of a hybrid connector 1100. Hybrid connector 1100 is similar to connector 700 of FIG. 12, except that one or more of the connector pins (e.g., pin 13b), which are capable of providing digital and analog signal transmission, is replaced with a corresponding one or more contact members in the form of RF pins 1110 each having an end 1112 and capable of providing RF signal transmission. Further, the presence of VCSEL 720 and optical fiber 730 is optional. In an example embodiment, at least one of the solder tails (e.g., 19b) corresponding to the removed pins is removed as well, as RF pins 1110 extend beyond the remaining pins, e.g. pins 13A, 13c, 13d, and out beyond the edge 14E of the IPCB 14. RF pin 1110 is sized to fit into the corresponding channel (e.g., channel 12b) of extruded metal housing 11.

Accurate electrical impedance is maintained for RF pin 1110 over a wide range of RF frequencies (e.g., from megahertz to gigahertz) by virtue of the air gap between the insulated walls of the housing channels and the RF pin. The size of the channels can be selected to achieve a desired air gap and thus a desired impedance value.

An advantage of hybrid connector 1100 is that both high-speed electrical digital signals and RF signals can be transmitted in a single connector. This allows for a high signal density as compared to using individual standard high-frequency connectors, such as SMAs or end-style connectors. The higher signal density is achieved, in part by the rectangular shape of the housing and the multiple channels formed therein, as compared to a round connector with a single channel formed therein.

By including VCSEL 720 and optical fiber 730 in connector 1100, the connector has the additional capability of providing an indirect optical signal, as described above.

Hybrid Connector with RF Wireless Link

Figure 18:
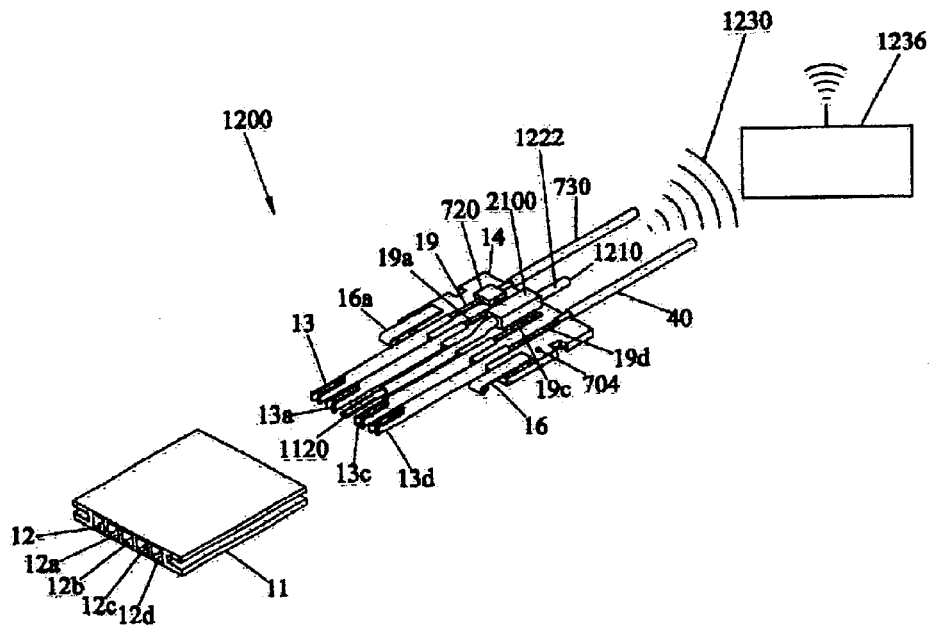
FIG. 18 is a perspective exploded view of the hybrid connector of the present invention that includes an RF wireless link.

With reference now to FIG. 18, there is shown an exploded perspective diagram of an example embodiment of a hybrid connector 1200. Hybrid connector 1200 is similar to connector 1100 of FIG. 12, except that the RF pin 1120 is terminated at an RF transmitter 1220 mounted on IPCB 14. The presence of VCSEL 720 and optical fiber 730 is optional. RF transmitter 1220 includes an RF antenna 1222. RF antenna 1222 is capable of emitting RF radiation 1230 to accomplish, for example, the wireless transmission of information to a remote RF device 1236.

An advantage of hybrid connector 1200 over conventional connectors is that it can provide both high-speed digital signals and RF wireless signals through in a single connector. This allows for a high signal density as compared to using individual standard high-frequency connectors, such as SMAs or end-style connectors. The higher signal density is achieved, in part by the rectangular shape of the housing and the multiple channels formed therein, as compared to a round connector with a single channel formed therein.

By including VCSEL 720 and optical fiber 730, hybrid connector 1000 has the additional capability of providing an indirect optical signal, as described above.

Hybrid Interconnect System

Figure 19:
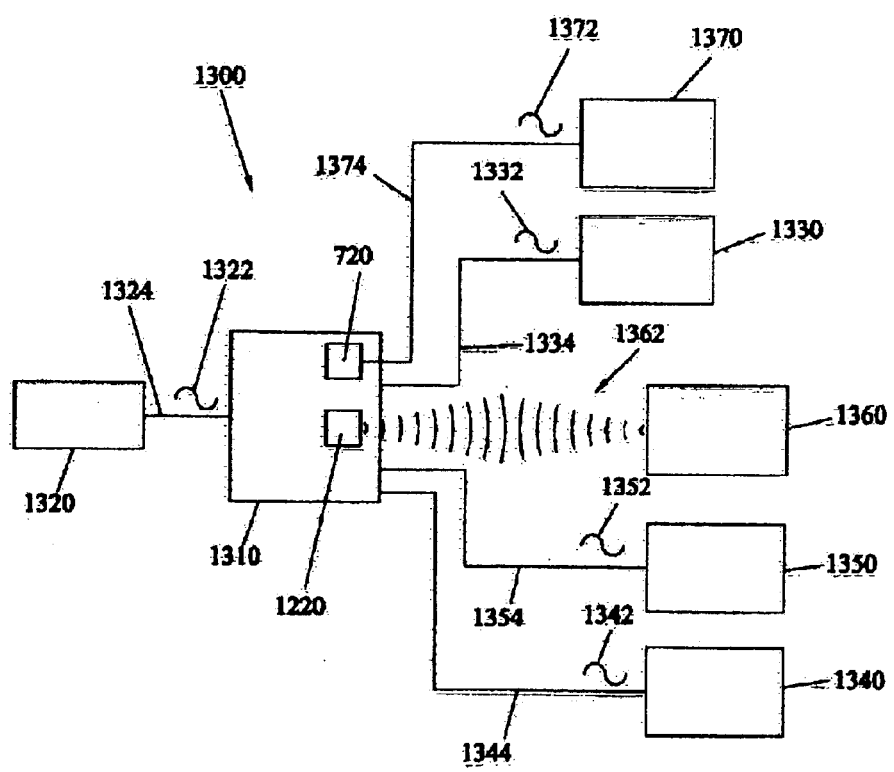
FIG. 19 is a schematic diagram an example embodiment of the hybrid connector of the present invention illustrating an example embodiment of an electrical-optical system that includes wireless RF link, direct RF link, direct fiber optic link, direct electrical digital link, and an indirect optical link through a VSCEL connected to an optical fiber.

With reference now to FIG. 19, there is shown a schematic diagram of a hybrid interconnect system 1300 that employs a hybrid connector 1310 that represents any one of hybrid connector example embodiments 1000, 1100 and 1200 described above.

In an example embodiment, system 1300 includes a backplane 1320, such as server panel or telecommunications switching panel, for example. Backplane 1320 provides electrical and/or optical signals, schematically illustrated as signal 1322. Backplane 1320 is operatively connected to hybrid connector 1310 at channels 12–12d (FIG. 12) via the connecting members residing therein. For example, backplane 1320 includes connecting members (schematically illustrated by connection 1324), such as RF contact pins, analog contact pins, high-speed digital contact pins, and/or optical fiber ends, that mate or otherwise interface with corresponding pins and optical fiber ends of hybrid connector 1310 (pins 13a, 13c, 13d and end of optical fiber 1030; FIG. 16).

In another example embodiment, system 1300 also includes an optical device 1330, such as a fiber optic distribution panel, capable of transmitting and/or receiving an optical signal 1332. Optical device 1330 is operatively connected to hybrid connector 1310 via an optical fiber 1334 that passes through one of the connector channels to form a direct fiber optic interconnection with backplane 1320.

In a further example embodiment, system 1300 also includes an electrical device 1340, such as an electronic printed circuit board, capable of transmitting and/or receiving an electrical signal 1342, such as an analog or high-speed digital electrical signal. Electrical device 1340 is operatively connected to hybrid connector 1310 via a wire 1344, which is connected to one of solder tails 19–19d (see, e.g., FIGS. 12 and 17).

Figure 9:
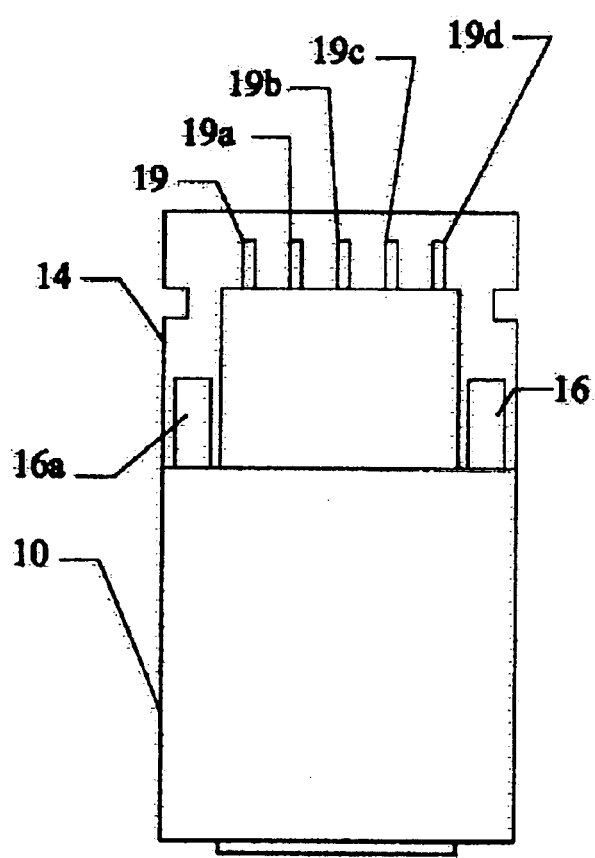
FIG. 9 is a top plan view of FIG. 8, showing the connector assembly for mounting to an electrical cable and the planer location of the ground tension contact points.
Figure 8:
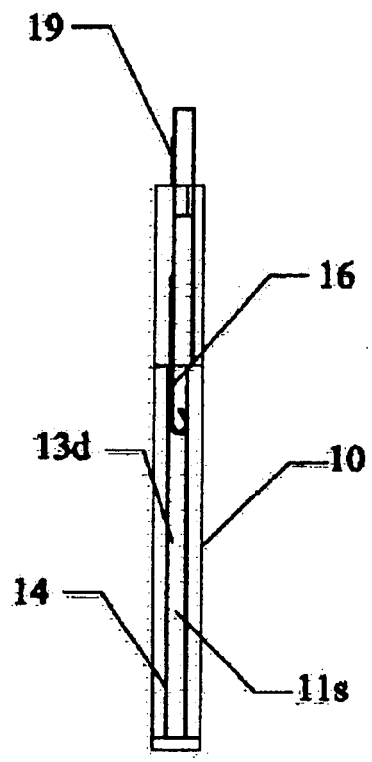
FIG. 8 is a side view of the connector assembly showing the ground contact tension points.

In another example embodiment, system 1300 also includes an RF electrical device 1350, such as an RF switching network, capable of transmitting and/or receiving an RF electrical signal 1352. RF electrical device 1350 is operatively connected to hybrid connector 1310 via an RF wire 1354, which is connected to one of solder tails 19–19d (see, e.g., FIG. 9 or 12).

In another example embodiment, system 1300 also includes a remote RF electrical device 1360, such as a computer monitor, capable of transmitting and/or receiving RF wireless signals 1362. Remote RF electrical device 1360 is operatively coupled to hybrid connector 1310 via RF wireless signals 1362. In particular, RF wireless signals 1362 are transmitted and received by RF transmitter 1220.

In another example embodiment, system 1300 also includes an optical device 1370, such as electro-optical transmitter, capable of transmitting and/or receiving an optical signal 1372. Optical device 1370 is coupled to VCSEL 720 via an optical fiber 1374.

In an example embodiment of the operation of system 1300 of FIG. 19, backplane 1320 distributes, via hybrid connector 1310, electrical signals, optical signals, RF signals, or a combination thereof (collectively represented by signal 1322) to one or more of the corresponding devices, i.e., optical devices 1330 and 1370, remote RF electrical device 1360, RF electrical device 1350, electrical device 1340 and fiber optic device 1330. Example embodiments of system 1300 thus include two or more of any of the aforementioned devices, which are shown together in FIG. 19 for the sake of reference.

System 1300 thus provides for the transmission of different types of signals (e.g., electrical and optical, or RF electrical, high-speed digital signals and analog electrical signals) emitted from a backplane to a number of different devices. The type of contact members provided in hybrid connector 1310 depends on the nature of the signals provided via backplane 1320.

The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Accordingly, other embodiments are within the scope of the appended claims.

What is claimed is:

1. A connector apparatus, comprising:
   a metallic extruded housing having a first plurality of connector channels formed therein during extrusion;
   an intermediate printed circuit board (IPCB) with a second plurality of spaced apart electrical contact pins mated with corresponding connector channels, said corresponding connector channels each having an insulating layer; and
   one or more optical fibers attached to the IPCB and mated with corresponding one or more of the first plurality of connector channels not occupied by the electrical contact pins.

2. The apparatus of claim 1, wherein the one or more optical fiber have respective first ends that terminate at a distance from the IPCB substantially equal to respective ends of the plurality of electrical contact pins;

3. The apparatus of claim 1, wherein at least one of the one or more optical fibers is connected to an optical device.

4. A connector apparatus, comprising:
   a metallic extruded housing having a plurality of connector channels formed therein during extrusion;
   an intermediate printed circuit board (IPCB) with a plurality of spaced apart electrical contact pins mated with corresponding connector channels, said corresponding connector channels each having an insulating layer; and
   one or more radio-frequency (RF) pins arranged on the IPCB and mated with corresponding one or more of the connector channels not occupied by the electrical contact pins.

5. The apparatus of claim 4, wherein at least one of the one or more RF pins is connected to an RF electrical device.

6. The apparatus of claim 4, wherein at least one of the one or more RF pins terminates at a wireless RF transmitter attached to the IPCB.

7. The apparatus of claim 6, wherein the wireless RF transmitter is capable of communicating with a remote RF device via RF radiation.

8. The connector of claim 1, wherein at least one of the electrical contact members is an RF pin capable of transmitting an RF electrical signal.

9. The connector of claim 8, wherein the RF pin terminates at a wireless RF transmitter attached to the IPCB.

10. The connector of claim 1, wherein at least one of the contact members terminates at a vertical cavity surface emitting laser (VCSEL) attached to the IPCB.

11. A hybrid interconnection system, comprising:
    a backplane that transmits at least two or more signals selected from the group of signals consisting of: an analog electrical signal, a high-speed digital electrical signal, an RF electrical signal and an optical signal;
    a hybrid connector coupled to the backplane, the hybrid connector comprising:
    a metallic extruded housing having a plurality of connector channels formed therein during extrusion, wherein select ones of the plurality connector channels designated to mate with electrical contact pins have an insulating layer;
    an intermediate printed circuit board (IPCB) having contact members that reside within the connector channels and that are adapted to interface with the backplane so as to receive and transmit the at least two or more signals.

12. The system of claim 11, wherein the contact members are connected to corresponding devices that are respectively adapted to receive the two or more signals.

13. The system of claim 12, wherein the devices include one or more devices selected from the group of devices consisting of: an optical device, a remote RF electrical device, a remote high-speed digital electrical device and an analog electrical device.

14. The system of claim 11, wherein the contact members includes two or more electrical contact pins and one or more optical fibers.

15. The system of claim 14, wherein the two or more electrical contact pins includes at least one of an RF contact pin, an analog contact pin and a high-speed digital contact pin.

16. The system of claim 14, wherein the two or more electrical contact pins include at least one RF contact pin terminated at an wireless RF transmitter that is capable of communicating with a remote RF device via RF radiation.

\* \* \* \* \*